United States Patent
Corman et al.

[11] Patent Number: 5,952,100
[45] Date of Patent: Sep. 14, 1999

[54] SILICON-DOPED BORON NITRIDE COATED FIBERS IN SILICON MELT INFILTRATED COMPOSITES

[75] Inventors: Gregory Scot Corman, Ballston Lake; Krishan Lal Luthra, Schenectady, both of N.Y.

[73] Assignee: General Electric Company, Schenectady, N.Y.

[21] Appl. No.: 08/861,044

[22] Filed: May 21, 1997

[51] Int. Cl.[6] .................................................. B32B 9/00
[52] U.S. Cl. ...................... 428/384; 428/368; 428/378; 428/379; 428/386; 428/446; 428/698; 428/408; 428/704
[58] Field of Search ..................... 428/379, 698, 428/446, 368, 378, 384, 704, 408, 386; 501/88

[56] References Cited

U.S. PATENT DOCUMENTS

| | | | |
|---|---|---|---|
| 4,863,798 | 9/1989 | Arenz et al. | 428/379 |
| 4,889,686 | 12/1989 | Singh et al. | 419/13 |
| 5,015,540 | 5/1991 | Borom et al. | 428/699 |
| 5,021,367 | 6/1991 | Singh et al. | 501/88 |
| 5,043,303 | 8/1991 | Singh et al. | 428/698 |
| 5,051,301 | 9/1991 | Singh et al. | 428/378 |
| 5,057,465 | 10/1991 | Sakamoto et al. | 428/378 |
| 5,068,154 | 11/1991 | Mignani et al. | 428/446 |
| 5,198,302 | 3/1993 | Chyung et al. | 428/375 |
| 5,294,489 | 3/1994 | Luthra et al. | 428/379 |
| 5,427,986 | 6/1995 | Chyung et al. | 428/366 |
| 5,552,352 | 9/1996 | Brun et al. | 501/88 |
| 5,723,213 | 3/1998 | Carpenter et al. | 428/368 |

*Primary Examiner*—Archene Turner
*Attorney, Agent, or Firm*—Noreen C. Jonson; Douglas E. Stoner

[57] ABSTRACT

A fiber-reinforced silicon—silicon carbide matrix composite having improved oxidation resistance at high temperatures in dry or water-containing environments is produced. The invention also provides a method for protecting the reinforcing fibers in the silicon—silicon carbide matrix composites by coating the fibers with a silicon-doped boron nitride coating.

16 Claims, 2 Drawing Sheets

SILICON-DOPED BORON NITRIDE COATED FIBERS IN SILICON MELT INFILTRATED COMPOSITES

The government may have certain rights to the invention under a government contract with the Department of Energy (DOE), contract number DEFC0292CE41000.

FIELD OF THE INVENTION

This invention relates to dense ceramic matrix composites suitable for high temperature applications in water-containing environments. This invention further relates to silicon-doped boron nitride coated fibers in silicon melt infiltrated ceramic matrix composites. More particularly, the invention relates to a method to protect ceramic fibers with a silicon-doped boron nitride coating in silicon—silicon carbide ceramic matrix composites that are exposed to wet, aqueous, environments.

BACKGROUND OF THE INVENTION

Structural materials today need to operate at higher temperatures. Most ceramic materials have good long-term stability against creep and chemical attack at temperatures above the operating range for current alloys. Because of ceramic's low fracture energies, however, ceramics are subject to catastrophic failure. Even relatively small defects can start propagation of cracks that can catastrophically propagate through the ceramic component. Therefore, measures for improving their fracture toughness, i.e., toughening ceramics without sacrificing their excellent properties, are sought after.

One way to toughen ceramics is to have fiber-reinforced ceramic composites. The fiber-reinforced ceramics generally are called ceramic matrix composites, or CMCs. Fiber-reinforced ceramic composites possess higher temperature capability and lighter weight than those of the currently used superalloys. As a result, they are being considered for use in aircraft and power generator systems. In these potential applications, fiber-reinforced ceramic composites are subjected to severe thermal and mechanical conditions. Although the fiber-reinforced composites will probably be designed to be used below their matrix cracking stress, accidental over stressing, either thermally as a result of a thermal shock or mechanically during a foreign object impact, can hardly be avoided.

Cracks will be generated in the fiber-reinforced composite matrix when the composite is subjected to a higher stress than its matrix cracking stress. Such cracks will stay open even if the operating stress is subsequently reduced to a value below the matrix cracking stress, exposing coatings and/or fibers to the environment. As a result, the existence of cracks in fiber-reinforced composite matrices will affect the performance and durability of the composites, especially if the cracks are through the thickness of the composites.

These cracks can serve as a fast path for the transport of environmental gaseous phases into the composite. Oxygen can diffuse very rapidly through even extremely small cracks in the matrix. The fibers and any coating that may be on the fiber can oxidize by oxygen diffusing through the crack. Oxygen reacts with the fiber coating and eventually the fiber, causing local bonding between the fiber and matrix. Fiber failure will initiate at this bonded location because of the resultant stress concentration and fiber degradation. The same occurs when the fiber ends are exposed. This process continues until the remaining fibers are unable to carry the load, and the composite fails at a stress appreciably less than the ultimate strength. The composite also loses its tough behavior because of the strong bonding between the fiber and the matrix. Thus, a serious problem limiting the life of ceramic matrix composites is the oxidation of the fiber coating followed by oxidation of the fiber at the base of the crack.

Generally, carbon or boron nitride have been the materials of choice for fiber coatings used in ceramic matrix composites for high temperature use. They provide for fiber protection during composite processing and they also provide a weak fiber to matrix interface, which increases toughness of the composite by fiber pullout or fiber-matrix debonding. However, carbon oxidizes in all oxygen-containing environments, and boron nitride is susceptible to oxidation and subsequent volatilization at high temperatures, particularly in atmospheres with high partial pressures of water vapor, such as products of fuel combustion as in gas turbine engines. Oxidation and volatilization of the boron nitride coatings lead to bonding of the fiber and matrix, thereby yielding a brittle composite. It is thus desirable to have a fiber coating which exhibits fiber-matrix debonding, but is more resistant to oxidation and high water content environments.

The ceramic matrix composites of interest for engine applications have focused on carbon-carbon composites, having a carbon matrix with carbon fibers, and silicon carbide composites, which have a silicon carbide matrix with silicon carbide fibers, the fibers usually being coated. An important limitation to the use of carbonized structural materials is their susceptibility to oxidation in high temperature, oxidizing environments. Oxygen attacks the surface of the carbonized material and seeps into the pores of interstices that invariably are present, oxidizing the surfaces of the pores and continuously weakening the material. The oxidizing atmosphere reaching the fibers, carbon and graphite fibers, seriously degrades the composite structure. An approach to overcome the oxidation of carbon-carbon composites has been the use of glass-formers as oxidation inhibitors. The glass-formers are used as coatings surrounding the outer carbon-carbon composite. In spite of the advances that have been made in carbon-carbon composites, there is still a demand for improved ceramic composites with higher temperature and mechanical capability.

Silicon carbide-silicon carbide composites are silicon carbide fibers in a silicon carbide matrix. A method of making silicon carbide composites is the use of chemical vapor infiltration. Here, layers of cloth made of the fiber material are coated with boron nitride by chemical vapor infiltration. This takes about one day to deposit about 0.5 micrometers of coating material. The layers of cloth are then coated with silicon carbide by chemical vapor infiltration for about 10 to 20 days. An approach to overcome the oxidation of silicon carbide composites has been the use of an oxygen-scavenging sealant-forming region in intimate contact with the ceramic fibers and a debonding layer, as described in U.S. Pat. No. 5,094,901.

There is a need for an improved ceramic matrix composite that successfully protects reinforcing fibers from oxidation and water-containing environments. There is a further need for a method of making a ceramic matrix composite that takes less time than the chemical vapor infiltration methods for silicon carbide-silicon carbide composites and carbon-carbon composites. There is also a need for a method to make silicon—silicon carbide matrix composites and articles made from molten silicon infiltration that provides protection in dry and water vapor-containing environments at high temperatures, greater than about 600° C.

SUMMARY OF THE INVENTION

These needs are satisfied by the development of a fiber-reinforced silicon—silicon carbide matrix composite having improved oxidation resistance at high temperatures in dry or water-containing environments. The invention provides a method for protecting the fiber-matrix interface in the silicon—silicon carbide matrix composites by coating the fibers with silicon-doped boron nitride. The fibers are further protected by the addition of silicon in the boron nitride coating, which forms a glassy substance. A crucial factor is the ratio of silicon to boron in the coating, such as the atomic ratio or weight ratio, that is needed to improve the oxidation resistance of the composite, particularly in water-containing environments, while maintaining the toughness of the composite.

A benefit of this invention is the preservation of the composite properties when the silicon—silicon carbide matrix composite is subjected to higher stresses than the matrix cracking stress. Since the silicon-doped boron nitride coating protects the underlying fiber, the toughness of the overall silicon—silicon carbide composite is maintained in oxidative and water-containing environments.

Briefly then, one aspect of the invention is a method for increasing the toughness of silicon—silicon carbide matrix composites reinforced with fibers, comprising the steps of: selecting a preform containing fibrous material having at least one coating of silicon-doped boron nitride and an admixture comprising the coated fibers with a matrix constituent material that comprises particles selected from the group consisting of carbon, silicon carbide, and mixtures thereof; and infiltrating at least molten silicon into said preform to form a dense silicon—silicon carbide matrix composite with reinforcing fibers.

In another aspect of the invention, there is provided a fiber-reinforced silicon—silicon carbide matrix composite with improved oxidation and volatilization resistance, comprising silicon-doped boron nitride coated fibers in a silicon—silicon carbide matrix.

Yet another aspect of the invention includes an article of manufacture for use in an engine, said article made of a ceramic matrix composite having an elemental silicon phase, a silicon carbide phase, coated fibrous material, where said fibrous material has at least one coating of silicon-doped boron nitride.

The reinforced-fiber silicon—silicon carbide matrix composite of the present invention includes a dense matrix comprising an elemental silicon phase and a silicon carbide phase, reinforcing silicon carbide-containing fibers having at least a silicon-doped boron nitride coating, possessing thermal stability at processing temperatures of at least 1420° C. and chemical and mechanical stability in water-containing environments.

DESCRIPTION OF THE INVENTION

Figure 1:
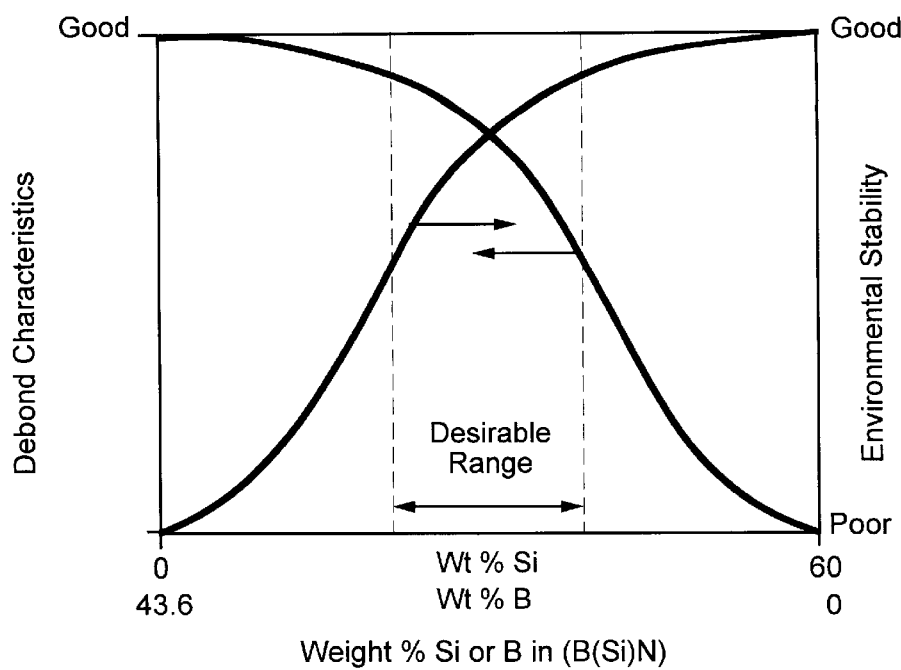
FIG. 1 is a schematic representation of the behavior of debond characteristics and environmental stability with silicon content in silicon-doped boron nitride type fiber coatings.

The subject invention relates to a process for producing silicon carbide-containing fiber reinforced dense silicon—silicon carbide matrix composites wherein the fibers are coated with at least a silicon-doped boron nitride coating, and the article thus produced. The matrix material provided in the present invention is molten silicon infiltrated silicon—silicon carbide which possesses net shape processing capability and ease of fabrication.

The present invention produces a dense ceramic matrix composite, which means that it generally has a porosity of less than about 20% by volume. The composite comprises a fibrous material of which the fibrous material component comprises at least about 5% by volume of the composite and has at least a silicon-doped boron nitride coating {B(Si)N} with a weight ratio of silicon to total weight of the {B(Si)N} coating between about 5 weight percent to about 40 weight percent; and a composite matrix having at least about 1% by volume of a phase of elemental silicon comprising substantially silicon. The elemental silicon phase comprises substantially silicon, but may have other dissolved elements, such as boron. It has further been discovered that coated fibers provide oxidation protection and tough composites in high temperature, wet or dry environments.

Another embodiment of the invention is provided by a method of making a silicon—silicon carbide matrix composite capable of improved properties in oxidative and wet environments comprising the steps of: depositing at least a silicon-doped boron nitride coating on a silicon carbide-containing fibrous material, said coating substantially covering an outer surface of said fibrous material; admixing a matrix constituent material comprising particles selected from the group consisting of carbon, silicon carbide, and mixtures thereof, with said fibrous material; forming said admixture into a preform; infiltrating said preform with an infiltrant comprising substantially molten silicon; and cooling said infiltrated preform to produce the silicon—silicon carbide matrix composite, where a ratio of silicon weight to total weight of said B(Si)N coating is between about 5 weight percent to about 40 weight percent.

As used herein, "carbon" includes all forms of elemental carbon including graphite, particles, flakes, whiskers, or fibers of amorphous, single crystal, or polycrystalline carbon, carbonized plant fibers, lamp black, finely divided coal, charcoal, and carbonized polymer fibers or felt such as rayon, polyacrylonitrile, and polyacetylene. "Fibrous material" includes fibers, filaments, strands, bundles, whiskers, cloth, felt, and a combination thereof. The fibers may be continuous or discontinuous. Reference to silicon carbide-containing fiber or fibrous material includes presently available materials where silicon carbide envelops a core or substrate, or where silicon carbide is a core or substrate. Other core materials which may be enveloped by silicon carbide include carbon and tungsten. The fibrous material can be amorphous, crystalline, or a mixture thereof. The crystalline material may be single crystal or polycrystalline. Examples of silicon carbide-containing fibrous materials are silicon carbide, Si-C-O, Si-C-O-N, Si-C-B, and Si-C-O-Metal where the Metal component can vary, but frequently is titanium, zirconium, or boron. There are processes known in the art which use organic precursors to produce silicon carbide-containing fibers which may introduce a wide variety of elements into the fibers. Examples of these fibers include Nicalon™, Hi-Nicalon™, and Hi-Nicalon S™, registered trademarks of Nippon Carbon Company, Ltd., Yokohama, Japan; Tyranno™ fibers, a registered trademark of Ube Industries, Ltd., Ube City, Yamaguchi, Japan; and Sylramic™ fibers, a registered trademark of Dow Corning Corporation, Midland, Mich.

In carrying out the present process, a coating system is deposited on the fibrous material which leaves at least no significant portion of the fibrous material exposed, and preferably, the entire material is coated. The coating system may contain one coating or a series of coatings. If there is only one coating, it is a silicon-doped boron nitride {B(Si)N} coating or a graded coating of boron nitride to silicon doped boron nitride. The coating should be continuous, free of any significant porosity and preferably it is pore-free and significantly uniform. The silicon-containing compound in the coating is present in a sufficient amount to have a weight ratio of silicon to total weight of the B(Si)N coating between about 5 weight percent to about 40 weight percent. The preferred range is about 10 to 25 weight percent, and the most preferred range is about 11 to 19 weight percent.

The B(Si)N coating can be thought of chemically as an atomic mixture of boron nitride (BN) and silicon nitride ($Si_3N_4$), which can be amorphous or crystalline in nature. Different levels of silicon doping would correspond to different ratios of BN to $Si_3N_4$, and a complete range of B(Si)N compositions can be envisioned from pure BN to pure $Si_3N_4$. At one extreme of this range, pure BN gives good fiber-matrix debonding characteristics for a ceramic matrix composite, but the oxidation/volatilization resistance is poor. At the other extreme, pure $Si_3N_4$ has very good oxidation/volatilization resistance, but does not provide a weak fiber-matrix interface for fiber debonding during composite failure. At intermediate compositions, there exists a range of silicon contents where the B(Si)N provides both good fiber-matrix debonding characteristics and has good environmental stability. This is shown schematically in FIG. 1.

A range of silicon weight percent in the B(Si)N coating is about 5 to about 40 weight percent, and preferably about 10 to about 25 weight percent, and most preferably about 11 to about 19 weight percent silicon.

In addition to at least a B(Si)N coating, other configurations containing B(Si)N can also be used, such as multiple layers of B(Si)N with initial and/or intermediate carbon layers, or an initial layer of B(Si)N followed by further coatings of silicon carbide or $Si_3N_4$, or with additional layers of a silicon-wettable coating over the B(Si)N, such as carbon, or combinations of the above.

Still further examples of coating systems used in any combination with a B(Si)N coating on the fibers or fibrous material are: boron nitride and silicon carbide; boron nitride, silicon nitride; boron nitride, carbon, silicon nitride, etc. Examples of further coatings on the fibrous material that are contemplated for this invention are nitrides, borides, carbides, oxides, silicides, or other similar ceramic refractory material. Representative of ceramic carbide coatings are carbides of boron, chromium, hafnium, niobium, silicon, tantalum, titanium, vanadium, zirconium, and mixtures thereof. Representative of the ceramic nitrides useful in the present process are the nitrides of hafnium, niobium, silicon, tantalum, titanium, vanadium, zirconium, and mixtures thereof. Examples of ceramic borides are the borides of hafnium, niobium, tantalum, titanium, vanadium, zirconium, and mixtures thereof. Examples of oxide coatings are oxides of aluminum, yttrium, titanium, zirconium, beryllium, silicon, and the rare earths. The thickness of the coatings may range between about 0.3 to 5 micrometers.

As stated, the fibrous material may have more than one coating. An additional protective coating may be wettable with silicon and be about 500 Angstroms to about 3 micrometers. Representative of useful silicon-wettable materials is elemental carbon, metal carbide, a metal coating which later reacts with molten silicon to form a silicide, a metal nitride such as silicon nitride, and a metal silicide. Elemental carbon is preferred and is usually deposited on the underlying coating in the form of pyrolytic carbon. Generally, the metal carbide is a carbide of silicon, tantalum, titanium, or tungsten. Generally, the metal silicide is a silicide of chromium, molybdenum, tantalum, titanium, tungsten, and zirconium. The metal which later reacts with molten silicon to form a silicide must have a melting point higher than the melting point of silicon and preferably higher than about 1450° C. Usually, the metal and silicide thereof are solid in the present process. Representative of such metals is chromium, molybdenum, tantalum, titanium, and tungsten.

Known techniques can be used to deposit the coatings which generally is deposited by chemical vapor deposition using low pressure techniques.

In this process, fibers may be bundled in tows and coated with a coating or combination of coatings. The tows are formed into a structure, which is then infiltrated with molten silicon. In these methods a boron nitride coating on the fiber is often used to protect the fiber from attack by molten silicon or for debonding. The silicon-doped boron nitride coating would then be in addition to or in place of the undoped boron nitride coating. The coatings in this invention can be graded from an undoped boron nitride to a silicon doped boron nitride coating. Non-graded coatings are also contemplated for use in this invention.

Another method used to make silicon carbide-silicon composites uses fibers in the form of cloth or 3-D structure, which are layered into the desired shape. Boron nitride coating is deposited on the cloth layers by chemical vapor infiltration as mentioned above, and a silicon-doped boron nitride coating would then be in addition to or in place of the undoped boron nitride coating. Additional coatings of silicon carbide or silicon nitride may be present on the boron nitride coating. The coatings in this invention can be graded from an undoped boron nitride to a silicon doped boron nitride coating. Non-graded coatings are also contemplated for use in this invention. The structure is then processed in a slurry and melt infiltrated with molten silicon. The molten silicon may contain minute amounts of other elements, such as boron and molybdenum.

As stated above, the coated fibrous material is admixed with a matrix constituent material which comprises at least a carbon or silicon carbide or mixture of carbon and silicon carbide material. Other elements or compounds may be added to the admixture to give different composite properties or structure. The particular composition of the admixture is determinable empirically and depends largely on the particular composition desired, i.e., the particular properties desired in the composite. However, the admixture always contains sufficient elemental carbon, or silicon carbide, or mixtures of carbon and silicon carbide, to enable the production of the present silicon—silicon carbide matrix composite. Specifically, the preform should contain sufficient elemental carbon or silicon carbide or mixtures of carbon and silicon carbide, generally most or all of which may be provided by the admixture and some of which may be provided as a sacrificial coating on the fibrous material, to react with the molten silicon infiltrant to produce the present composite, containing silicon carbide and silicon. Generally, elemental carbon ranges from about 0% by volume, or from about 10% or 20% by volume, to almost about 100% by volume of the admixture.

The mixture of carbon or silicon carbide or carbon and silicon carbide in the preform can be in the form of a powder and may have an average particle size of less than about 50 microns, more preferably less than about 10 microns. The molten silicon that infiltrates the preform is comprised substantially of silicon, but may also contain elemental boron, which has limited solubility in the molten silicon. The silicon infiltrant may also contain boron-containing compounds or other elements or compounds.

The admixture in the preform containing the carbon or silicon carbide or mixture of silicon carbide and carbon, is wetted by the molten silicon infiltrant. In carrying out the present process, the preform is contacted with the silicon infiltrant by an infiltrating means. The infiltrating means allow the molten silicon infiltrant to be infiltrated into the preform. U.S. Pat. No. 4,737,328, incorporated herein by reference, discloses an infiltration technique. In the present process, sufficient molten silicon infiltrant is infiltrated into the preform to produce the present composite. Specifically, the molten silicon infiltrant is mobile and highly reactive with any carbon present in the preform to form silicon carbide. Pockets of a silicon phase also form in the matrix.

The period of time required for infiltration is determinable empirically and depends largely on the size of the preform and extent of infiltration required. Generally, it is complete in less than about 60 minutes, and often in less than about 10 minutes. The resulting infiltrated body is cooled in an atmosphere and at a rate which has no significant deleterious effect on it.

The present composite then is comprised of coated fibrous material and a matrix phase. The matrix phase is distributed through the coated fibrous material and generally it is substantially space filling and usually it is interconnecting. Generally, the coated fibrous material is totally enveloped by the matrix phase. The matrix phase contains a phase mixture of silicon carbide and silicon. The fibrous material comprises at least about 5% by volume, or at least about 10% by volume of the composite. The matrix contains a silicon carbide phase in an amount of about 5% to 95% by volume, or about 10% to 80% by volume, or about 20% to 60% by volume of the composite. The matrix may contain an elemental silicon phase in an amount of about 1% to 30% by volume of the composite.

The following examples further serve to demonstrate, but not limit, the invention.

EXAMPLES

A Hi-Nicalon silicon carbide fiber tow was coated with a nominal 1 micron thick coating of B(Si)N containing about 15 weight percent silicon. The coated tow was pre-impregnated with a carbon-containing slurry and wound onto a drum to form a unidirectional pre-preg tape. The slurry, from which the matrix of the composite preform is derived, was prepared by adding 300 grams of zirconia grinding media, 35 grams of silicon carbide powder, 15 grams of carbon powder, 8 grams of polyvinyl butyral resin, 14 grams of furfuryl alcohol-derived resin, 2 grams of a dispersant, 40.32 grams of toluene and 26.77 grams of 4-methyl-2-pentanone to a 250 milliliter polyethylene bottle. The mixture was shaken on a paint shaker for ten minutes to mix the ingredients and then was placed on a ball mill for one hour to fully homogenize the mixture. After drying for two hours, the tape was cut off the drum, cut into sections, laid up by hand (a 6-ply composite with 4 plies reinforced in the 0° direction and 2 plies reinforced in the 90° direction), and then laminated in a heated press at 120° C. and 100 pounds per square inch for 15 minutes.

The resulting laminated composite preform was placed in an oven at 120° C. overnight to cure the resins in the matrix. Burnout of the binders and silicon melt infiltration was performed in one continuous operation, but these processes can be done separately. The composite preform was placed on a carbon cloth wick which was supported on a boron-nitride coated graphite plate. Sufficient silicon (as a Si-5%B alloy) was placed on the wick to completely saturate the wick and fill the preform when molten. The assembly was then placed in a vacuum furnace containing a carbon electrical resistance heating element and carbon insulation, and the furnace evacuated to between 2 Torr and 20 mTorr using a mechanical vacuum pump. The initial heating rate of the furnace was 0.75° C. per minute up to 450° C. The slow heating rate is used to limit the rates of burn-out of the polyvinyl butyral binder and pyrolysis of the furfuryl resin. The heating rate was then increased to 1° C. per minute from 450 to 550° C. The furnace was then heated to 1380° C. at a rate of 4° C. per minute and held at 1380° C. for ten minutes to allow for the furnace temperature to equilibrate. The furnace was then heated from 1380° C. to 1430° C. at a rate of 3° C. per minute, held at 1430° C. for 20 minutes, and then cooled to 1350° C. at a rate of 3° C. minute. The furnace controller is then programmed to cool the furnace to room temperature at a rate of 5° C. per minute, but the heat capacity of the furnace prevents the furnace from cooling this quickly in practice.

Figure 2:
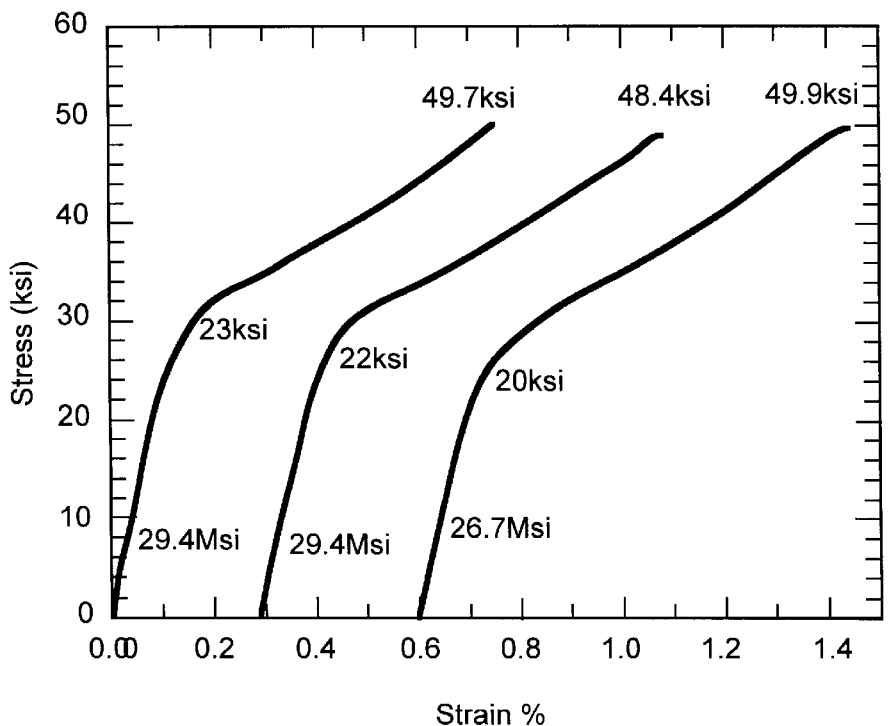
FIG. 2 is a graph showing the tensile stress-strain behavior of a silicon melt infiltrated ceramic matrix composite reinforced with silicon carbide fibers coated with silicon-doped boron nitride containing 15 weight percent silicon.

After cooling, the infiltrated composite body was removed from the attached carbon cloth wicks and straight-edge tensile bars were machined from the composite panel using diamond abrasive cutting and grinding. The bars were then tensile tested to failure in an Instron testing machine with strain measured with a contacting extensometer. Typical resulting stress-strain curves are shown in FIG. 2. The high strength and high strain following matrix cracking are indicative of proper fiber-matrix debonding during failure.

Figure 3:
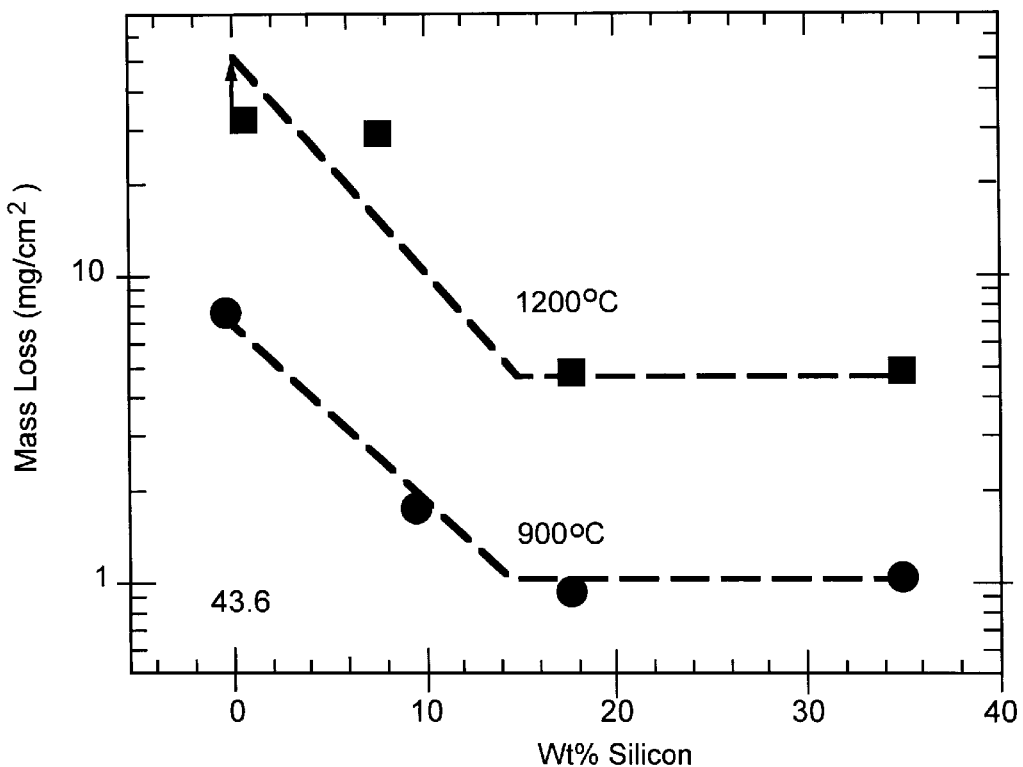
FIG. 3 is a graph showing the coating material oxidation/volatility as a function of weight percent silicon in the coating for twenty-four hour oxidation treatments in an atmosphere of ten percent oxygen and ninety percent water.

FIG. 3 shows the B(Si)N oxidation/volatility (Mass loss) as a function of weight percent (wt %) silicon for twenty-four hour oxidation treatments in an atmosphere of ten percent oxygen and ninety percent water. For low silicon levels the volatilization rates are high and then decrease with increasing silicon content up to about fifteen weight percent silicon. The oxidation/volatilization rate does not change much after that, which indicates that 15 wt % silicon or higher is preferable for maximum resistance to oxidation in wet atmospheres.

Figure 4:
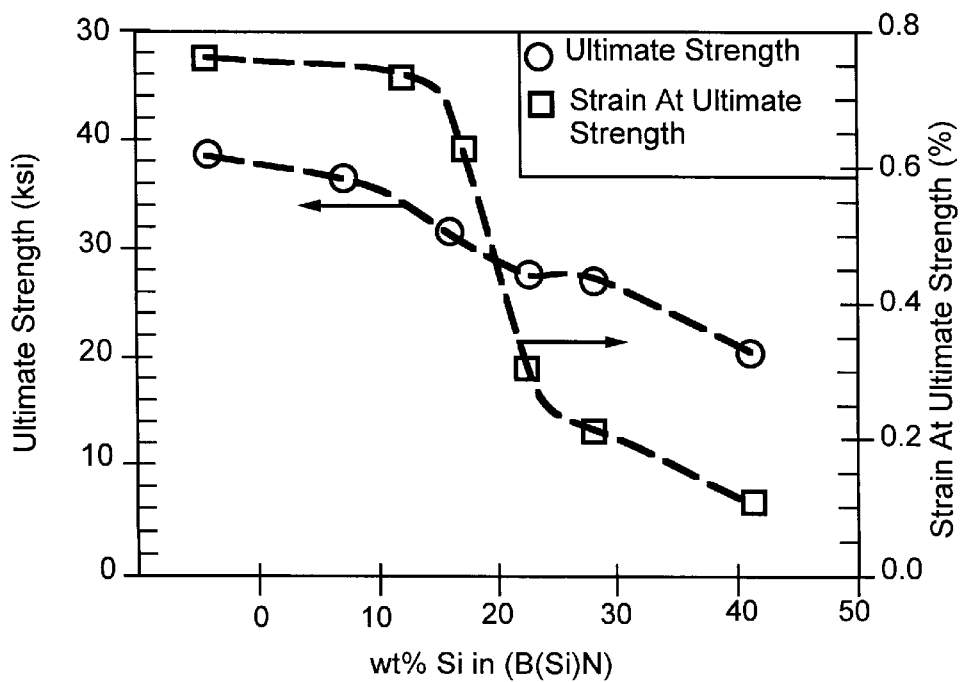
FIG. 4 is a graph showing the behavior of the fiber coatings in a composite for different levels of silicon doping by plotting ultimate strength (ksi) and strain at ultimate strength (%) versus weight percent silicon.

FIG. 4 shows the behavior of the fiber coatings in a composite for different levels of silicon doping. In pure boron nitride coatings (0% silicon), the boron nitride is chemically attacked during the melt infiltration process. The data in FIG. 4 for 0% Silicon are for a composite with a coating of pure boron nitride and additional protective coatings of carbon and silicon nitride. All other data are for coatings without the additional silicon nitride coating. Adding silicon increases the chemical resistance of the coating to molten silicon during composite processing and at about fifteen weight percent silicon both the strength and strain values are very good, even without the additional silicon nitride coating. Beyond about twenty weight percent silicon, the coatings may no longer provide for easy debonding of the fiber and matrix so that the composites become more and more brittle with decreased strengths and failure strains.

What is claimed:

1. A fiber-reinforced silicon—silicon carbide matrix composite with improved oxidation and volatilization resistance, comprising silicon-doped boron nitride coated fibrous material in a silicon—silicon carbide matrix, wherein the silicon-doped boron nitride coating contains about 5 to about 40 weight percent silicon.

2. A composite according to claim 1 where the fibrous material includes fibers, filaments, strands, bundles, whiskers, cloth, felt, and a combination thereof.

3. A composite according to claim 2 where the fibrous material is silicon carbide-containing where silicon carbide envelops a core or substrate, or where silicon carbide is a core or substrate.

4. A composite according to claim 1 where said silicon—silicon carbide composite has a dense matrix comprising an elemental silicon phase and a silicon carbide phase and a porosity of less than about 20% by volume.

5. A composite according to claim 1 where the silicon-doped boron nitride coating contains about 10 to 25 weight percent silicon.

6. A composite according to claim 5 where the silicon-doped nitride coating contains about 11 to 19 weight percent silicon.

7. A composite according to claim 1 where the fibrous material has the silicon-doped boron nitride coating and an additional coating or coatings selected from the group consisting of boron nitride, carbon, carbides of boron, chromium, hafnium, niobium, silicon, tantalum, titanium, vanadium, zirconium, and carbides of mixtures of any of the foregoing; nitrides of hafnium, niobium, silicon, tantalum, titanium, vanadium, zirconium, and nitrides of mixtures of any of the foregoing; borides of hafnium, niobium, tantalum, titanium, vanadium, zirconium, and borides of mixtures of any of the foregoing; oxides of aluminum, yttrium, titanium, zirconium, beryllium, silicon, the rare earths, and oxides of mixtures of any of the foregoing.

8. An article of manufacture, or use in an engine, said article made of a ceramic matrix composite having an elemental silicon phase, a silicon carbide phase, and coated fibrous material, where said fibrous material has at least one coating of silicon-doped boron nitride.

9. An article of manufacture for use in an engine according to claim 8 where the fibrous material includes fibers, filaments, strands, bundles, whiskers, cloth, felt, and a combination thereof.

10. An article of manufacture for use in an engine according to claim 8 where the fibrous material is silicon carbide-containing where silicon carbide envelops a core or substrate, or where silicon carbide is a core or substrate.

11. An article of manufacture for use in an engine according to claim 8 where said composite has a dense matrix and a porosity of less than about 20% by volume.

12. An article of manufacture for use in an engine according to claim 8 where the silicon-doped boron nitride coating contains about 5 to 40 weight percent silicon.

13. An article of manufacture for use in an engine according to claim 12 where the silicon-doped boron nitride coating contains about 10 to 25 weight percent silicon.

14. An article of manufacture for use in an engine according to claim 13 where the silicon-doped nitride coating contains about 11 to 19 weight percent silicon.

15. An article of manufacture for use in an engine according to claim 8 where the fibrous material has the silicon-doped boron nitride coating and an additional coating or coatings selected from the group consisting of boron nitride, carbon, carbides of boron, chromium, hafnium, niobium, silicon, tantalum, titanium, vanadium, zirconium, and carbides of mixtures of any of the foregoing; nitrides of hafnium, niobium, silicon, tantalum, titanium, vanadium, zirconium, and nitrides of mixtures of any of the foregoing; borides of hafnium, niobium, tantalum, titanium, vanadium, zirconium, and borides of mixtures of any of the foregoing; oxides of aluminum, yttrium, titanium, zirconium, beryllium, silicon, the rare earths, and oxides of mixtures of any of the foregoing.

16. A composite according to claim 1, exhibiting a high level of oxidation resistance and fracture toughness in a water-containing environment.

* * * * *